Sept. 23, 1969   F. W. R. STARP   3,468,231
PHOTOGRAPHIC CAMERA WITH A FEED MECHANISM BUILT INTO THE HOUSING
Filed April 4, 1967   2 Sheets-Sheet 1
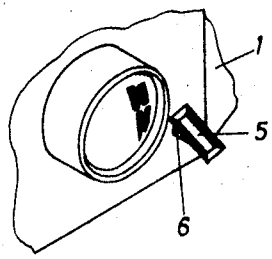
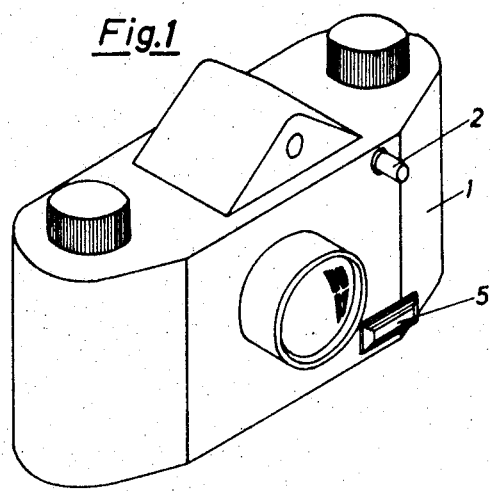
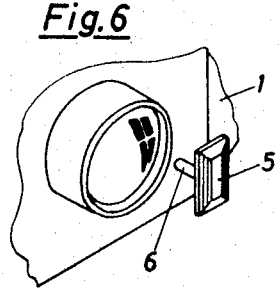
INVENTOR
Franz W. R. Starp
BY Arthur A. March
ATTORNEY Sept. 23, 1969   F. W. R. STARP   3,468,231
PHOTOGRAPHIC CAMERA WITH A FEED MECHANISM BUILT INTO THE HOUSING
Filed April 4, 1967   2 Sheets-Sheet 2

INVENTOR
Franz W.R. Starp
BY Arthur A. March
ATTORNEY

United States Patent Office 3,468,231
Patented Sept. 23, 1969

3,468,231
PHOTOGRAPHIC CAMERA WITH A FEED MECHANISM BUILT INTO THE HOUSING
Franz W. R. Starp, Calmbach, Black Forest, Germany, assignor to Prontor-Werk Alfred Gauthier G.m.b.H., Calmbach, Black Forest, Germany, a corporation of Germany
Filed Apr. 4, 1967, Ser. No. 628,386
Claims priority, application Germany, Apr. 6, 1966, P 39,145
Int. Cl. G03b 19/04
U.S. Cl. 95—31          10 Claims

ABSTRACT OF THE DISCLOSURE

A photographic camera having a spring driven feed mechanism in the form of a delayed action device or self timing mechanism arranged as a separate unit in the camera housing which can be brought into cocking position by means of an operating member. In addition, the camera is provided with a release part which releases the shutter at the end of the run of the feed mechanism. The operating member is in the form of an operating bar guided in the camera housing for longitudinal and rotational movement and gear connected with the feed mechanism. The feed mechanism is cockable by displacement of the operating bar, and by corresponding turning of the operating bar, the mechanism is either lockable or releasable.

---

The invention concerns a photographic camera with a spring driven feed mechanism in the form of a delayed action device or self-timing mechanism arranged in the camera housing as a separate unit, which can be brought into cocking position by means of an operating lever, and wherein the feed mechanism is provided in addition with a release part that releases the shutter at the end of the forward or running down motion.

In cameras with a built-in feed mechanism a pivotally mounted cocking lever is usually provided for cocking the feed mechanism, while the release of the feed mechanism is either effected by the camera release or by a special knob provided in the proximity of the cocking lever. These two operating members have been previously arranged so their paths of motion intersect so that additional transmission members deflecting the direction of motion must be provided to transmit the release motion, which in turn requires more effort during the release due to the increased friction. Since the cocking and release part of the feed mechanism is geared to a special camera type, the application possibilities of the feed mechanism is limited substantially to this type camera.

It is an object of this invention to provide a feed mechanism which is characterized, on the one hand, by a simple and part-saving design as well as by easy operation, and which can be used, on the other hand, in different types of cameras and, if necessary, with different types of shutters.

This problem is solved according to this invention by having the operating part formed as an operating bar connected with the feed mechanism or gear train and arranged in the camera housing for longitudinal and rotary movement. With this arrangement the feed mechanism can be made cockable by displacement, and lockable or releasable by corresponding turning. In this way the conditions can be created to ensure optimum freedom for the application of the feed mechanism to different types of cameras and shutters, and also maintain the arrangement of the feed mechanism to provide easy handling and the part-saving design. These advantages result because of the utilization of the rotary movement for locking and releasing the cocked feed mechanism, which allows for the elimination of a special release knob and a gear connection to the camera release.

A specific design of the feed mechanism furnished to obtain a particularly easy operation according to another feature of this invention, provides for the operating bar to be in engagement with a pivotally mounted lever having a toothed segment, the toothed segment being in gear connection with the drive shaft of the feed mechanism. In an expedient further development of the invention, an eccentric is rigidly connected with this shaft which carries a traction lever that can be brought in engagement with the lever transmitting the release movement. In this way a relatively high traction force can be produced with the energy stored in the feed mechanism so that the latter positively effects the release of the camera.

In order not to impair the freedom of handling the camera with the feed mechanism, there is provided, according to another feature of this invention, a pin arranged on the circumference of the operating bar which keeps the traction lever in a certain rotary position out of engagement with the release lever during the return thereof. This measure lets the feed mechanism run without releasing the camera so that, even after the feed mechanism is cocked, pictures can be taken, independent of the forward motion mechanism, by means of the usual camera release.

To make sure that the user of the camera is informed rapidly and reliably about the state of the feed mechanism, the end of the operating bar protruding from the camera housing may be provided with a rectangular or similarly shaped knob.

Various other objects, features and advantages of this invention will be apparent from the following specification, claims and the drawings appended hereto wherein:

FIGURE 1 is a perspective view of the camera of this invention having a feed mechanism built into the housing, whose operating bar protrudes at one end from the front side of the camera and is provided with a knob which is illustrated in the rest position of the feed mechanism.

FIGURE 3 is a fragmentary view similar to FIGURE 1 illustrating part of the front side of the camera with the operating bar pulled out and turned, so that the feed mechanism is cocked and locked.

FIGURE 6 is a fragmentary view similar to FIGURE 3 illustrating the operating bar in the cocking position and rotationally displaced permitting the feed mechanism to run-off without release of the camera.

Figure 2:
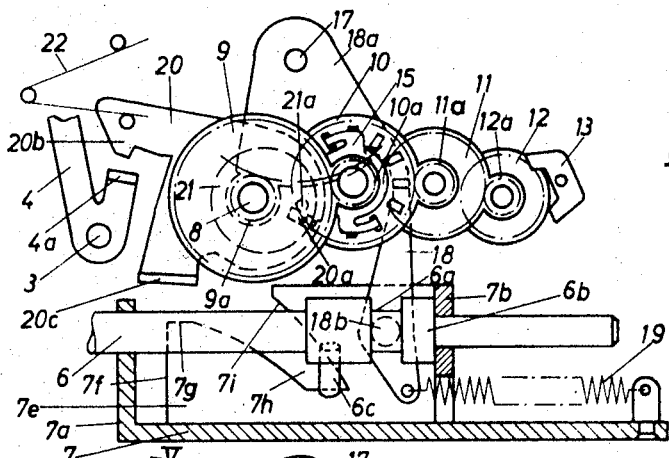
FIGURE 2 is a longitudinal cross sectional view of the feed mechanism in rest position of the camera of FIGURE 1.

Referring now to the drawings, a photographic camera is illustrated having a housing, designated by the reference numeral 1, and a release 2 which cooperates with a lever 4 on a pin 3 of a release mechanism supported inside the camera, as illustrated in FIGURE 2, by means of which the camera shutter, not shown, can be released. This shutter can be designed as a central shutter or as a slotted shutter. In the case of a reflex camera, the release lever 4 could also be used for releasing the mirror gear, which in turn starts the exposure.

Arranged in the camera housing 1 as a special group is a feed mechanism design as a separate unit, for actuation by a knob 5 provided on the front side of the camera. This knob 5 is secured on the end of an operating bar 6, protruding from the camera housing 1 and arranged in the housing for longitudinal and rotary movement, and the bar 6 is connected to the forward motion mechanism.

As it can be seen for example, from FIGURE 2, a stationary bearing block 7, which receives the operating bar in two webs 7a and 7b, can be provided for guiding the operating bar 6 in the camera housing 1. The gear train of the feed mechanism, consisting of a drive shaft 8, the gear wheels 9, 10, 11 and 12 and the respective pinions 9a, 10a, 11a and 12a, is mounted on the side walls 7c and 7d of the bearing block 7. The gear wheel 12 is designed as an anchor wheel and cooperates with an anchor 13, while the gear wheels 9, 11 and 12 are rigidly mounted on their respective pinions 9a, 11a and 12a. The gear wheel 10 can turn relative to its pinion 10a and can be coupled with the pinion by means of a unilaterally acting ratchet coupling 15 so that during the run of the feed mechanism the gear wheel 10 is rigidly connected with the pinion 10a by the ratchet coupling 15, while on cocking no torque is transmitted.

For connection of the operating bar 6 with the gear train of the feed mechanism, a lever 18 is provided for this purpose, which is supported on a pin 17 and is in constant engagement with the pinion 9a arranged on the drive shaft 8 by means of segment 18a. The free end of the lever 18 is biased by a driving spring 19, and a follower pin 18b is arranged on the lever 18, which constantly engages a ring groove 6a formed in the operating bar 6. The operating bar 6 is held in the starting position, as illustrated in FIGURE 2 by means of a collar 6b.

In order to hold the feed mechanism in cocking position, after it has been brought into this position, a locking pin 6c is arranged on the operating bar 6, which cooperates with a latch edge 7f provided on a web 7e of the bearing block 7. The web 7e is also provided with a supporting edge 7g as well as with a slot 7h and a control edge 7i, which likewise cooperate, in a manner to be described below, with the locking pin 6c of the operating bar 6.

For releasing the shutter by means of the feed mechanism thereis provided a traction lever 20 connected to the feed mechanism. This traction lever 20 bears on an eccentric 21 which is rigidly mounted on the drive shaft 8. The eccentric 21 carries a pin 21a which bears, in the starting position of the feed mechanism, on a stop 20a of the traction lever 20 and thereby keeping the lever 20 in the position shown in FIGURE 2 against the action of a spring 22. On the traction lever 20 there is also provided a follower portion 20b which engages a lug 4a of the release lever 4 at the end of the cocking movement. This engagement, however, can be released again, so that the feed mechanism can run off without releasing the shutter at the end. To this end the traction lever 20 is provided with a lug 20c on which the locking pin 6c strikes by a certain rotation of the operating bar 6 after the feed mechanism has been cocked, thereby again breaking the connection between the traction lever 20 and the release lever 4.

Figure 5:
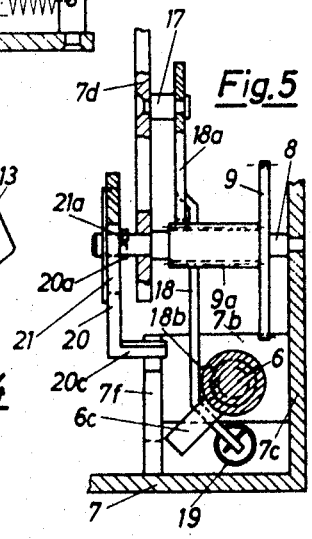
FIGURE 5 is a cross sectional view through the feed mechanism along the line V—V in FIGURE 4.

The handling and the method of operation of the above described feed mechanism, as represented in the drawing, is as follows:

In the rest position of the feed mechanism as illustrated in FIGURES 1 and 2, the operating bar 6 with its collar 6b under the action of the driving spring 19 bears on the web 7b of the bearing block 7. The angular position of the operating bar 6 is such that the locking pin 6c points obliquely downwardly to the web 7e as illustrated in FIGURE 5, while the knob 5 assumes the position illustrated in FIGURE 1.

Figure 4:
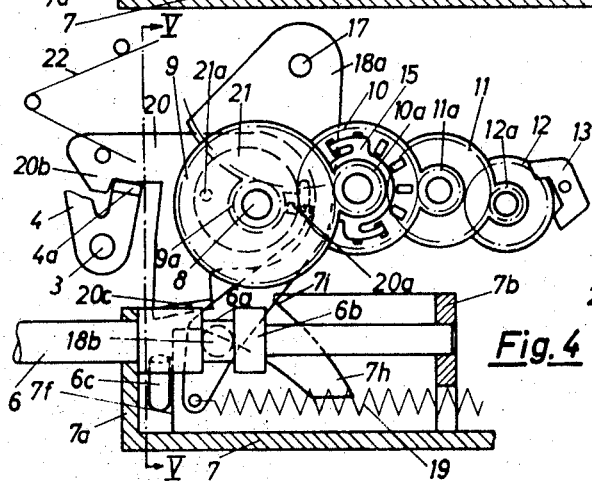
FIGURE 4 is a view similar to FIGURE 2 illustrating the feed mechanism in cocking position and its operating bar in a rotary position which results in the release of the camera by the feed mechanism at the end of the feed motion.

In order to cock the feed mechanism, the operating bar 6 is pulled out of the housing 1 by means of the knob 5 so that the bar 6 moves to the left as viewed in FIGURE 2. The segment 18a is moved clockwise by means of the lever 18, thereby increasing the tension of the driving spring 19, which in turn results, in a rotation of the pinion 9a as well as in the gear wheel 9 in opposite direction. The eccentric 21 rigidly mounted on the drive shaft 8 also moves in a counterclockwise direction and displaces the traction lever 20 to the left. During the rotation of the eccentric 21, its pin 21a leaves the stop 20a of the traction lever 20 so that the lever 20 engages the lug 4a of the release lever 4 with its follower portion 20b under the influence of the spring 22 at the end of the cocking movement as illustrated in FIGURE 4 of the drawing. Since the unilaterally acting ratchet coupling 15 transmits no torque on cocking, it is not necessary to pull through the entire feed mechanism during the cocking process. At the end of the cocking movement, the locking pin 6c assumes the position shown in FIGURE 4 with reference to the latch edge 7f. If it is desired to take pictures with the feed mechanism immediately after cocking, it is merely necessary to release the knob 5, after which the feed mechanism begins to run off, and starts the release of the shutter at the end of the run. But if it is desired to pause after cocking the feed mechanism for release at a later time, the operating bar 6 can be locked in cocked position by turning it by about 45 degrees clockwise, as illustrated in FIGURE 5, by means of the knob 5. The locking pin 6c moves in front of the latch edge 7f thereby preventing the run-off of the feed mechanism. The knob 5 then assumes the position shown in FIGURE 3. In order to release the feed mechanism, the knob 5 is turned back by the same amount and then released.

After the operating bar 6 is released, the lever 18 with the segment 18a turns counterclockwise under the influence of the driving spring 19 being delayed by the series-connected wheel train 9 to 13, and moves the operating bar 6 to the right as viewed in FIGURE 4. The eccentric 21 rigidly mounted on the drive shaft 8 performs a clockwise rotation, as does the pinion 9a and the gear wheel 9, and moves the traction lever 20 likewise to the right, which in turn moves the release lever 4 clockwise.

At the end of the run-off motion of the feed mechanism, the shutter and the camera gear are released by means of the release lever 4 in a conventional manner (not shown). Immediately thereafter, the pin 21a of the eccentric 21 strikes the stop 20a of the traction lever 20 and turns the lever 20 clockwise into the rest position shown in FIGURE 2, where the follower portion 20b leaves the lug 4a of the release lever 4 so that the lever 4 can return to its starting position.

Figure 7:
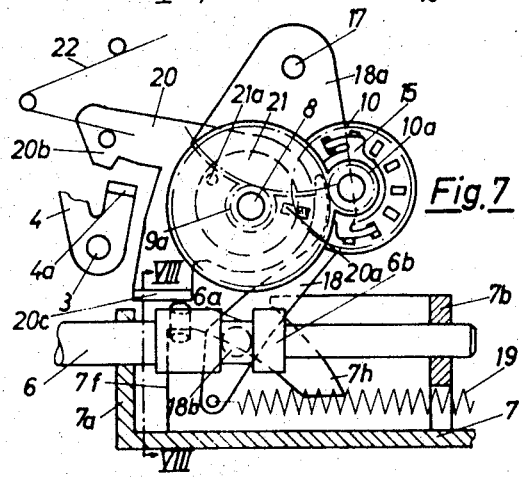
FIGURE 7 is a partial view similar to FIGURE 2 showing the feed mechanism in the setting corresponding to FIGURE 6.
Figure 8:
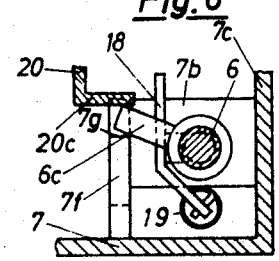
FIGURE 8 is a fragmentary cross sectional view through the feed mechanism corresponding to line VIII—VIII of FIGURE 7.

When the feed mechanism is cocked and it is decided that it is not advisable to take pictures with the feed mechanism, the latter can be released for run-off without releasing the shutter at the end. For this purpose the operating bar 6 brought into cocking position is turned clockwise beyond the locking position for a total of 90 degrees. The locking pin 6c strikes against the lug 20c of the traction lever 20 and turns the latter clockwise against the action of the spring 22, so that the follower portion 20b is disengaged from the lug 4a of the release lever 4 as illustrated in FIGURE 7. In this setting, the knob 5 assumes the position shown in FIGURE 6. When the knob 5 is released in the angular position, the locking pin 6c slides along the supporting edge 7g during the return of the operating bar 6. When the feed mechanism runs off, the traction lever 20 again moves to the right, but due to the fact that its lug 20c bears on the locking pin 6c it cannot engage the release lever 4. After a certain distance, the locking pin 6c moves into the guide slot 7h and thus leaves the lug 20c of the traction lever 20 which in the meantime has moved so far to the right that the follower portion 20b abuts the top side of the lug 4a, so that the release lever 4 no longer is taken along by the traction lever 20 even when the movement continues. With further run-off of the feed mechanism the locking pin 6c strikes the control edge 7i of the guide slot 7h, so that the returning operating bar 6 and the knob 5 are turned back into their starting position.

The invention is not limited to the embodiment illustrated as it has additional possible applications. Thus, the operating bar can be provided with an all-around toothing for connection with the gear train and be so arranged that the operating bar directly engages one of the gear wheels and pinions of the feed mechanism. The all-around toothing ensures that the operating bar can be brought into different rotary positions after cocking without breaking the gear connection between the gear train and the operating bar, just as in the represented example.

It will be understood that the foregoing description with the details of exemplary structure is not to be construed in any way to limit the invention, but that modifications may be made thereto without departing from the scope of the invention as set forth in the following claims.

Having thus described my invention, I claim:

1. A photographic camera comprising a spring driven feed mechanism arranged as a separate unit in the camera housing; an operating member for moving said feed mechanism into cocking position and a release part for releasing the shutter of said camera at the end of the run of said feed mechanism; said operating member being an operating bar guided in the camera housing for longitudinal and rotational movement and being gear-connected with said feed mechanism, said feed mechanism being cockable by displacement of said operating bar, and said feed mechanism being lockable and releasable by corresponding turning of said operating bar.

2. The camera of claim 1, wherein said operating bar is in engagement with a pivotally mounted lever having a toothed segment, said toothed segment being in gear-connection with a drive shaft of said feed mechanism.

3. The camera of claim 2, wherein an eccentric is rigidly connected to said drive shaft of said feed mechanism which eccentric carries a traction lever engagable with a release lever transmitting the release movement.

4. The camera of claim 3, wherein a pin is arranged on the circumference of said operating bar, and wherein said operating bar is rotatable to a position wherein said pin keeps said traction lever out of engagement with said release lever during its return.

5. The camera of claim 4 wherein the end of said operating bar protrudes from the camera housing and has a generally rectangular shaped knob on said end.

6. A photographic camera comprising a spring driven feed means on said camera; operating means for moving said feed mechanism into cocking position and for releasing the shutter of said camera at the end of the run of said feed mechanism; said operating means having an operating bar guided on said camera for longitudinal and rotational movement, said operating bar being operably connected with said feed mechanism, said feed mechanism being cockable by longitudinal movement of said operating bar, and said feed mechanism being lockable and releasable by rotational movement of said operating bar.

7. The camera of claim 6 wherein said operating bar is engaged with a pivotally mounted lever having a toothed segment, said toothed segment being operatively engaged with a drive shaft of said feed mechanism.

8. The camera of claim 7 wherein an eccentric is rigidly mounted on said drive shaft of said feed mechanism, and wherein said drive shaft has a traction lever mounted thereon engageable with a release lever for transmitting the release movement.

9. The camera of claim 8 wherein a pin is provided on said operating bar, and wherein said operating bar is rotatable to a position wherein said pin holds said traction lever out of engagement with said release lever during its return.

10. The camera of claim 9 wherein the end of said operating bar extends from said camera and has a generally rectangular shaped knob on said end.

References Cited

UNITED STATES PATENTS

| | | | |
|---|---|---|---|
| 2,713,293 | 7/1955 | Faulhaber | 95—31 XR |
| 2,738,716 | 3/1956 | Faulhaber et al. | 95—31 |
| 3,274,911 | 9/1966 | Greger et al. | 95—31 |

NORTON ANSHER, Primary Examiner

DAVID S. STALLARD, Assistant Examiner

U.S. Cl. X.R.

74—2